June 2, 1931.  R. EMERY  1,808,597
SELECTIVE MECHANISM
Filed June 23, 1925   12 Sheets-Sheet 6
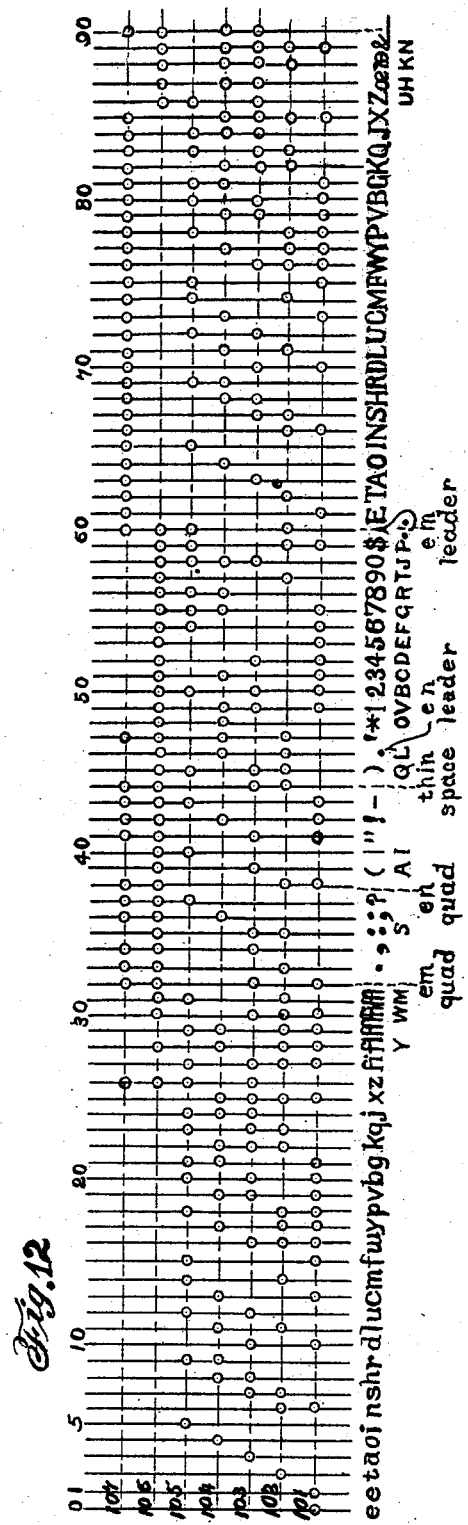
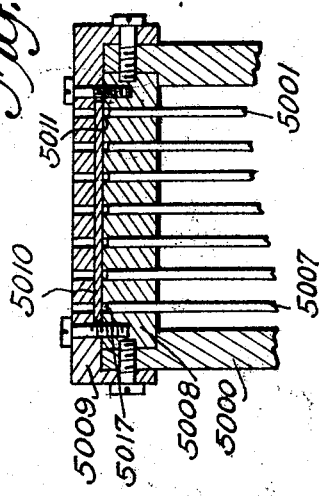
INVENTOR
Roy Emery
BY Charles F. Wilcox
HIS ATTORNEY

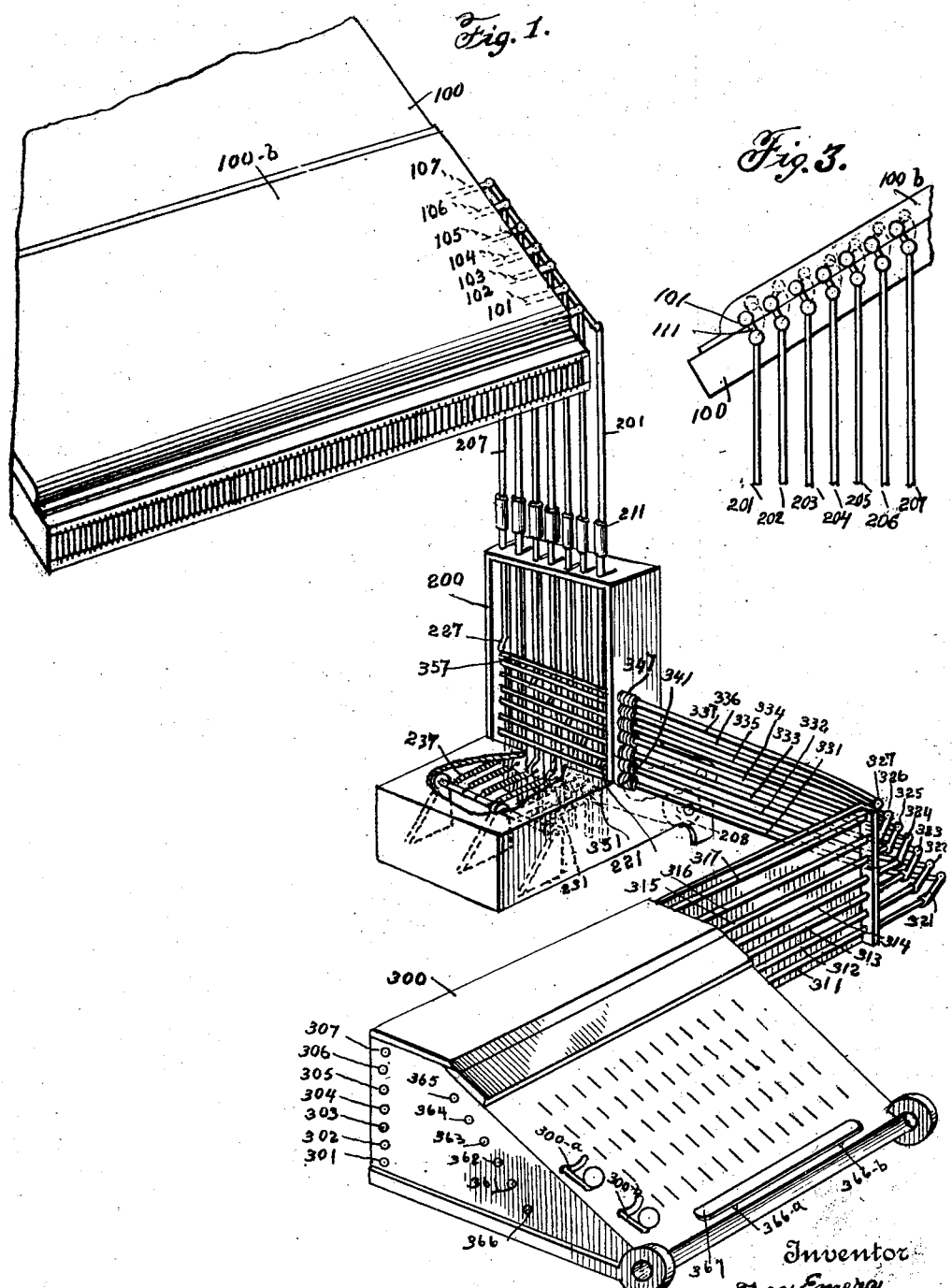

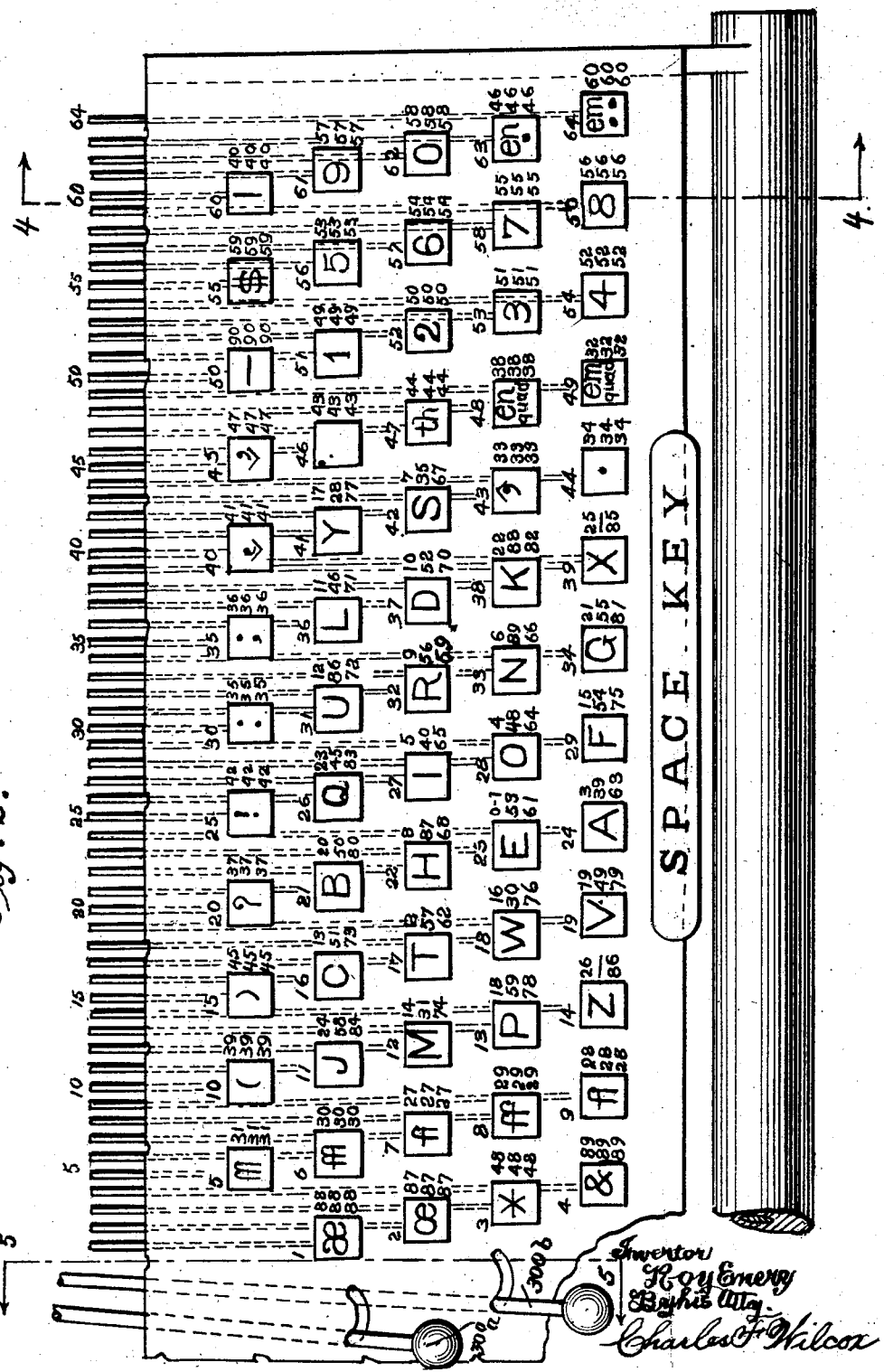

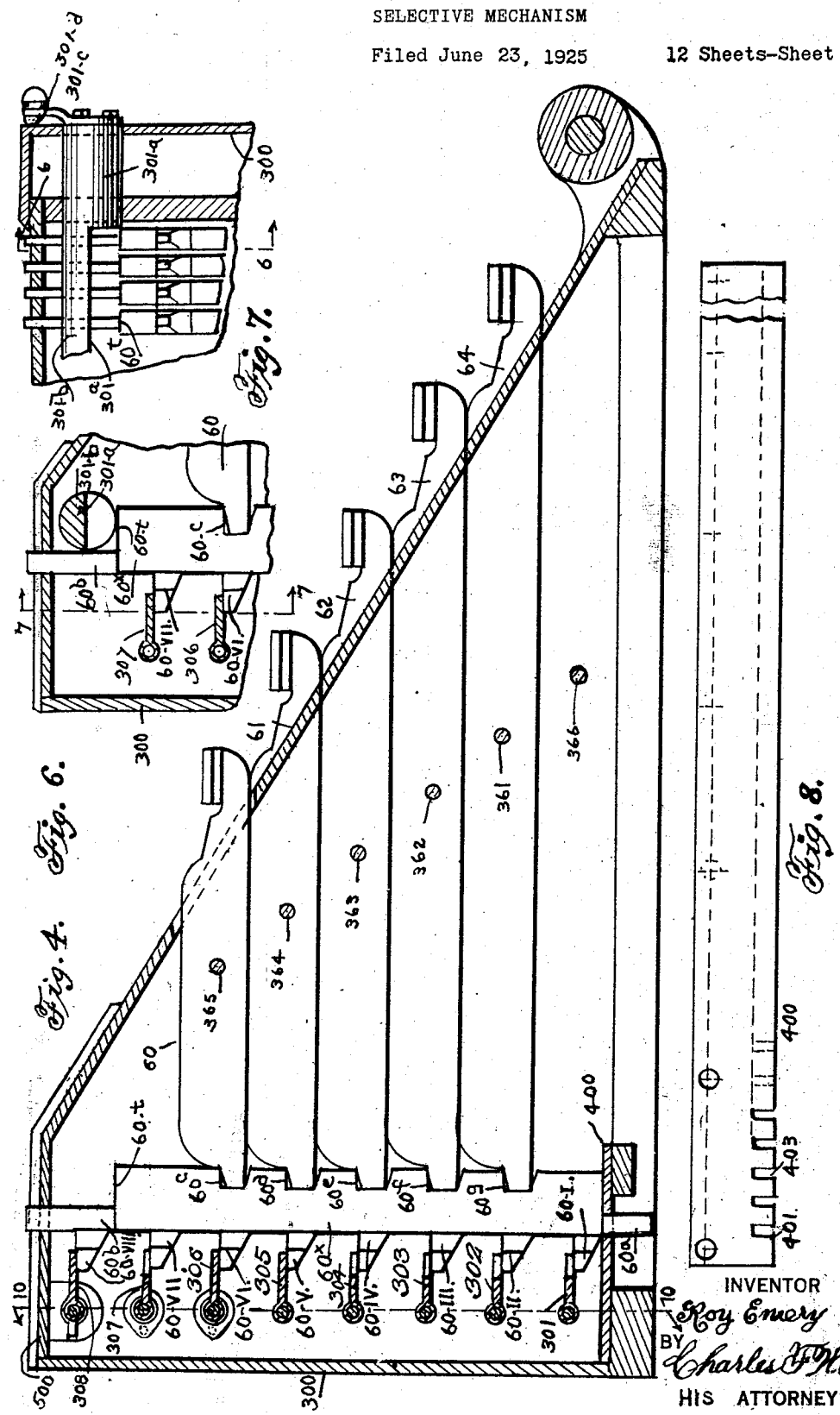

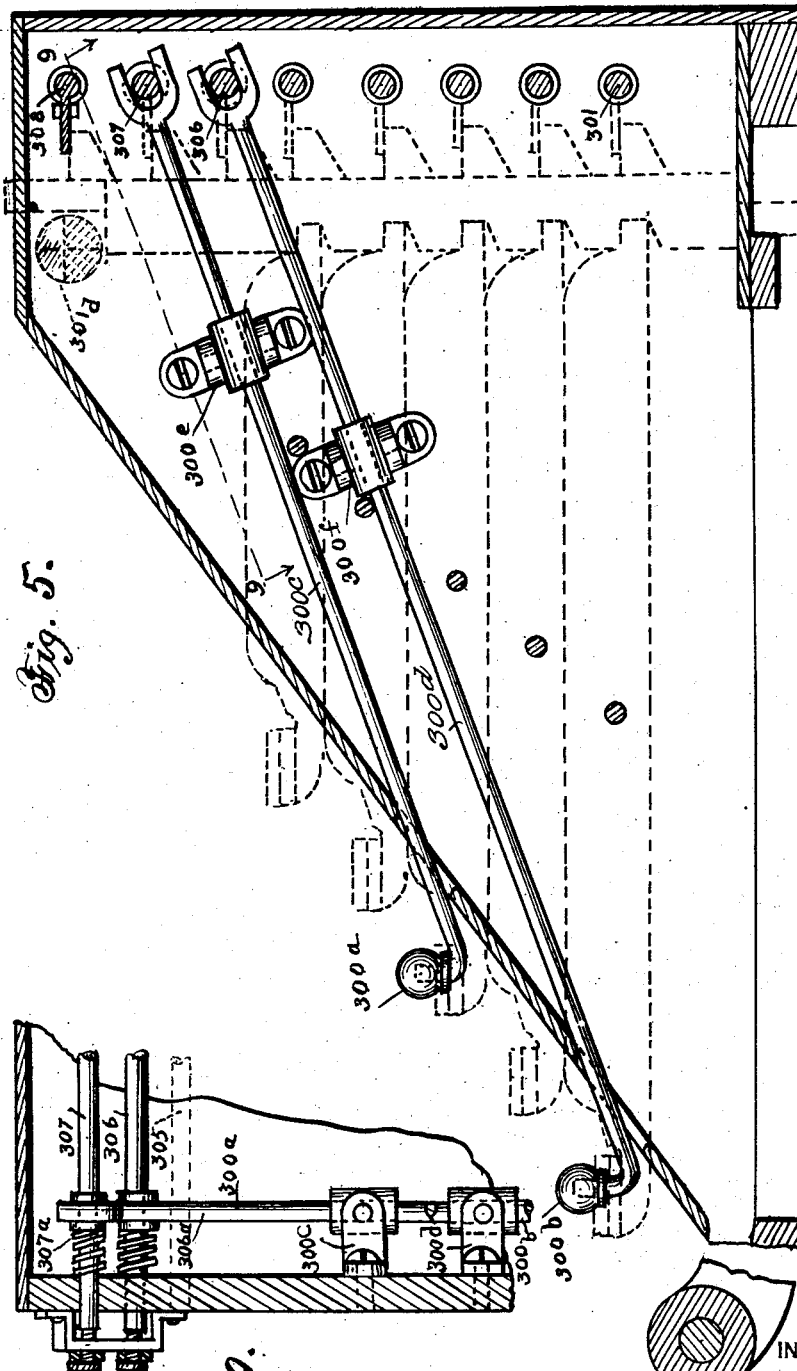

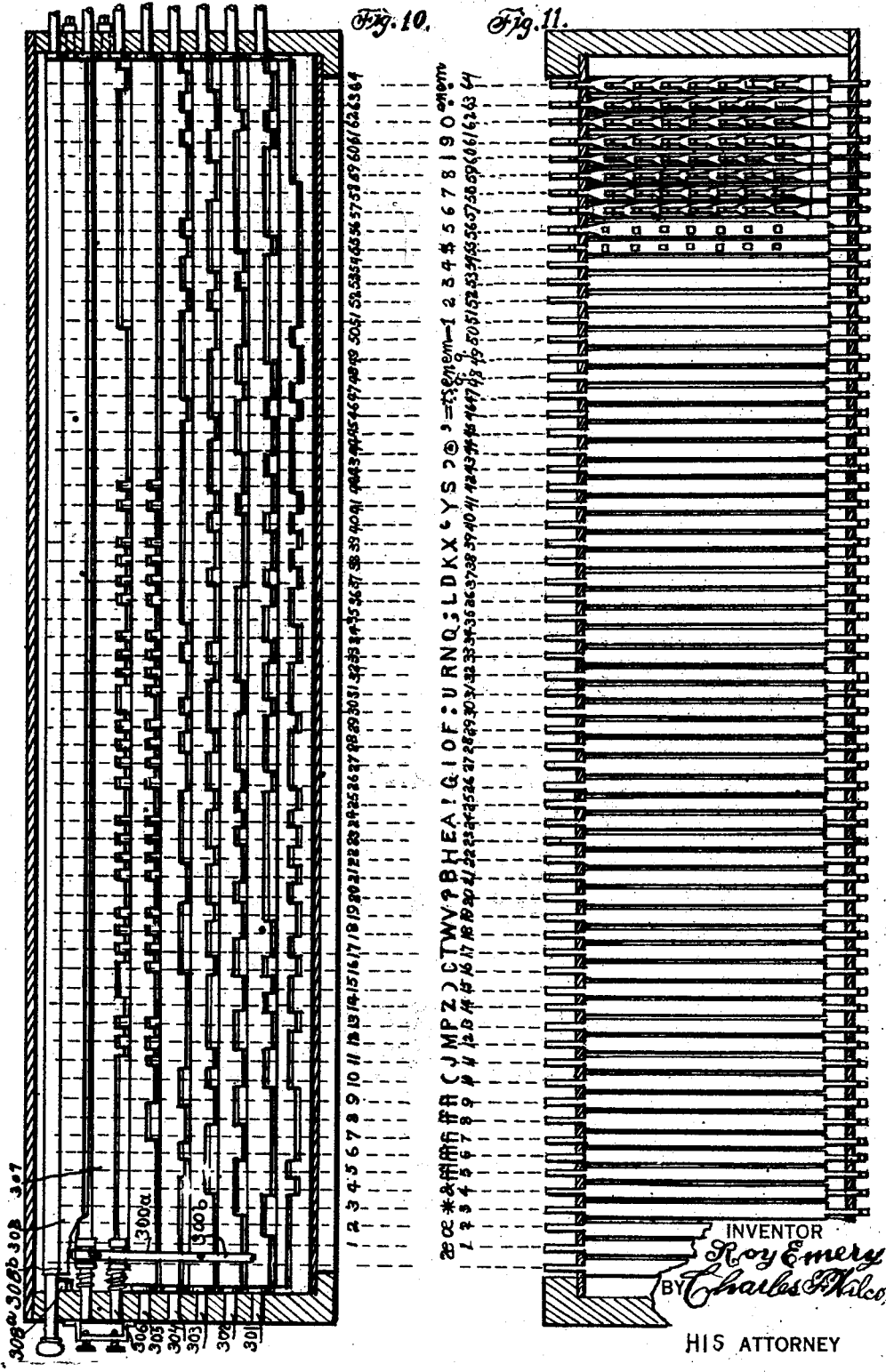

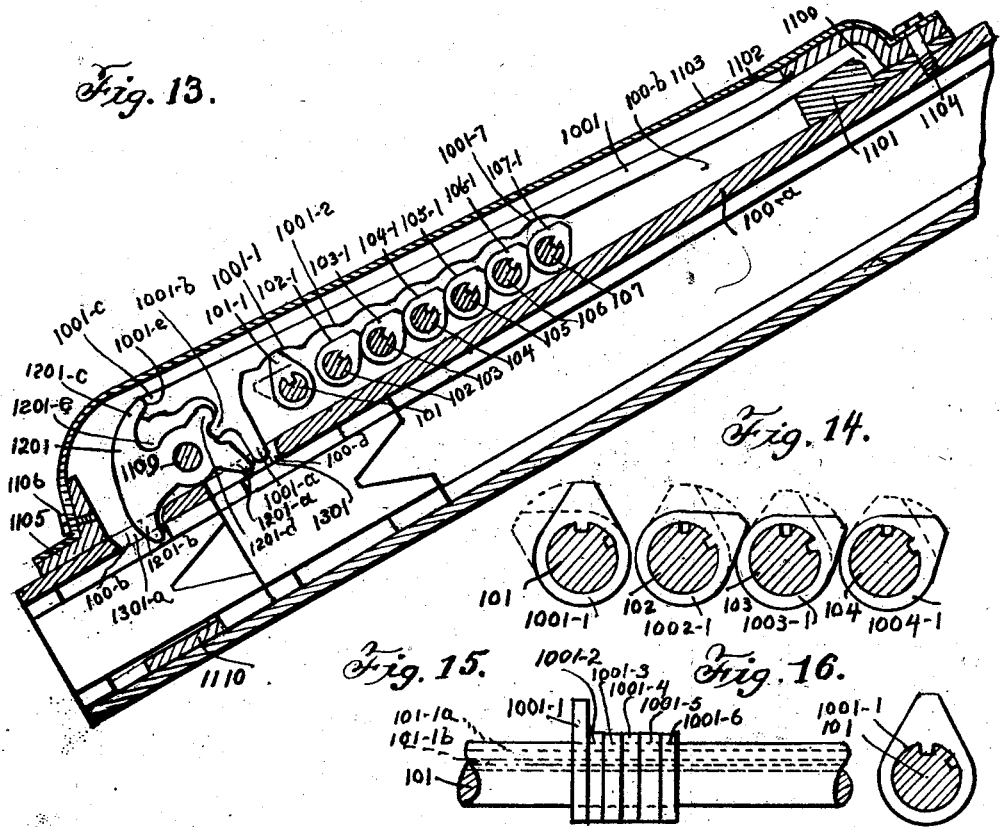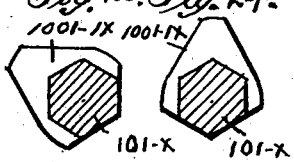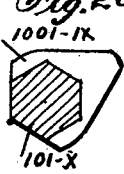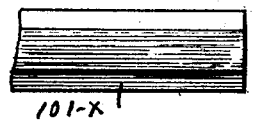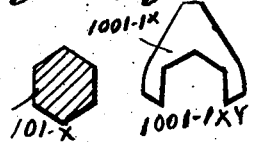

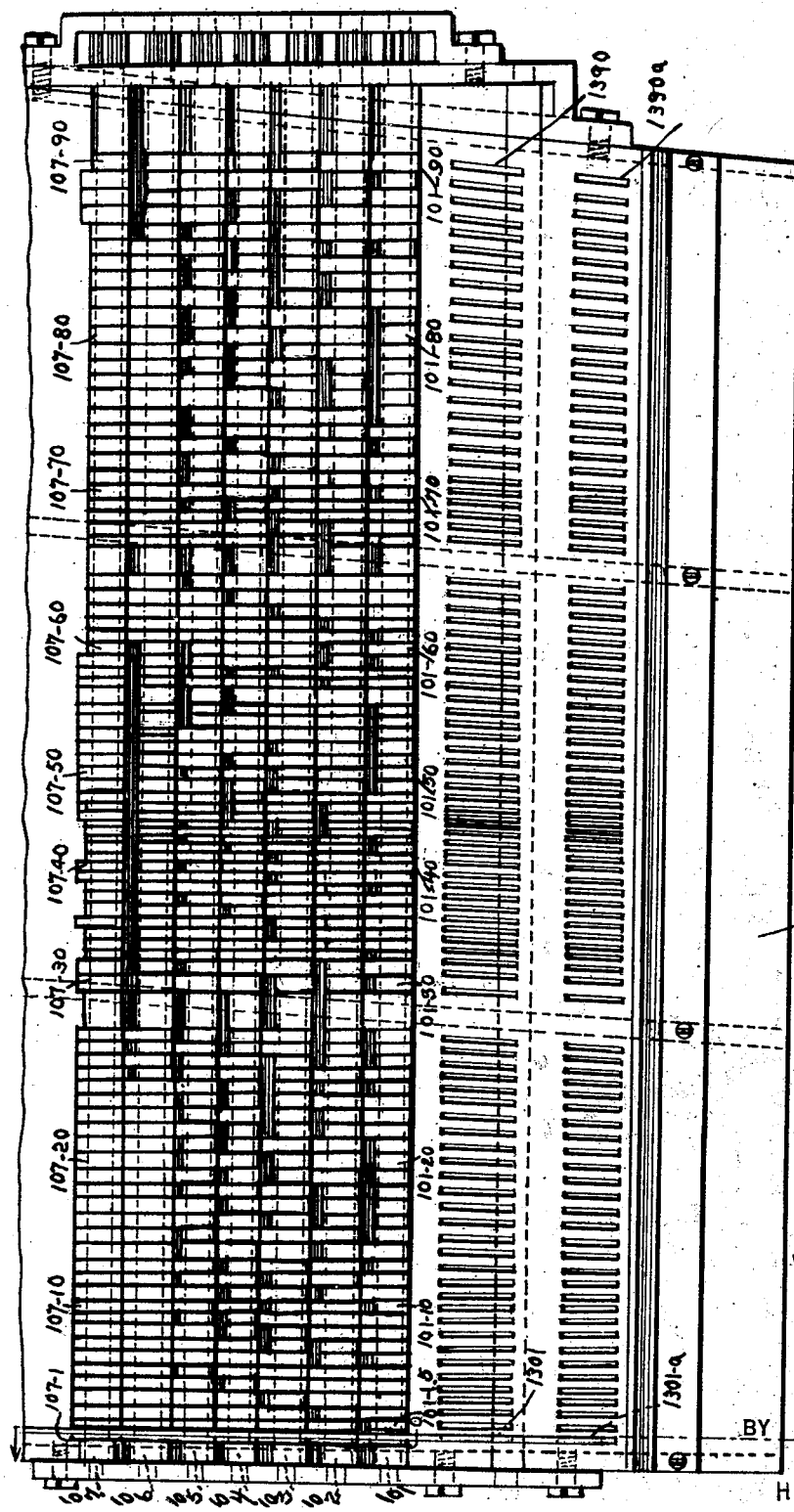

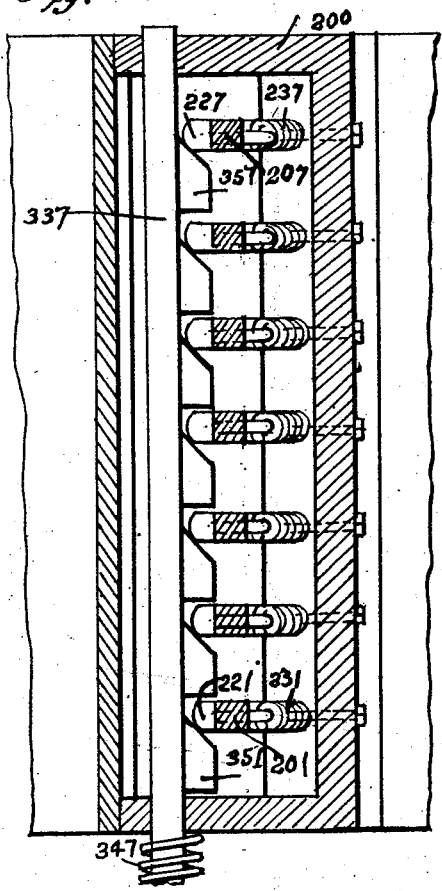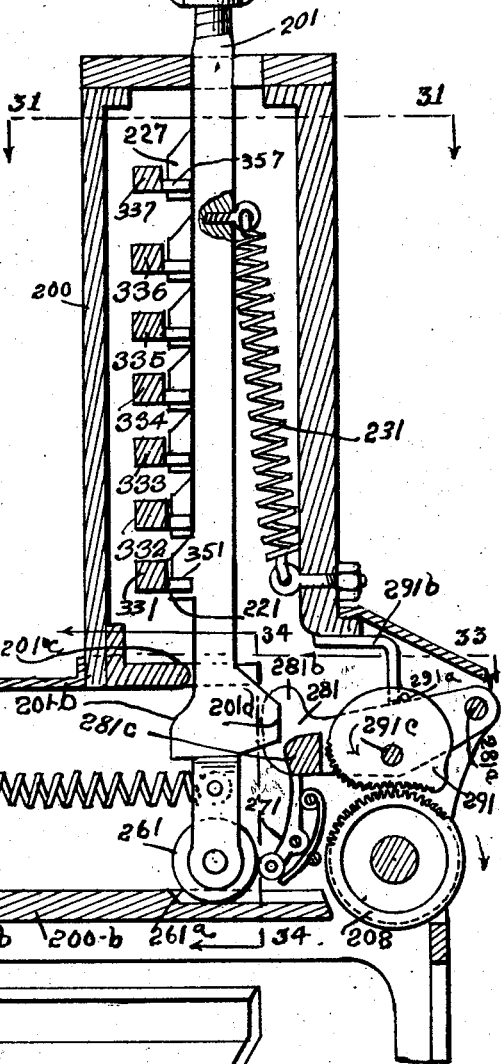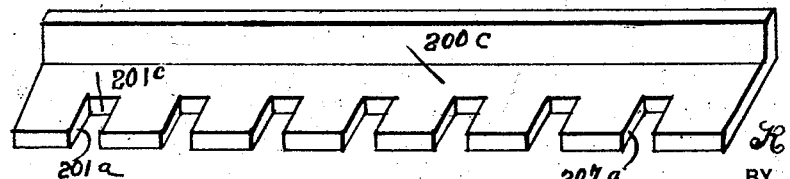

June 2, 1931.    R. EMERY    1,808,597
SELECTIVE MECHANISM
Filed June 23, 1925    12 Sheets-Sheet 10
Fig. 33.
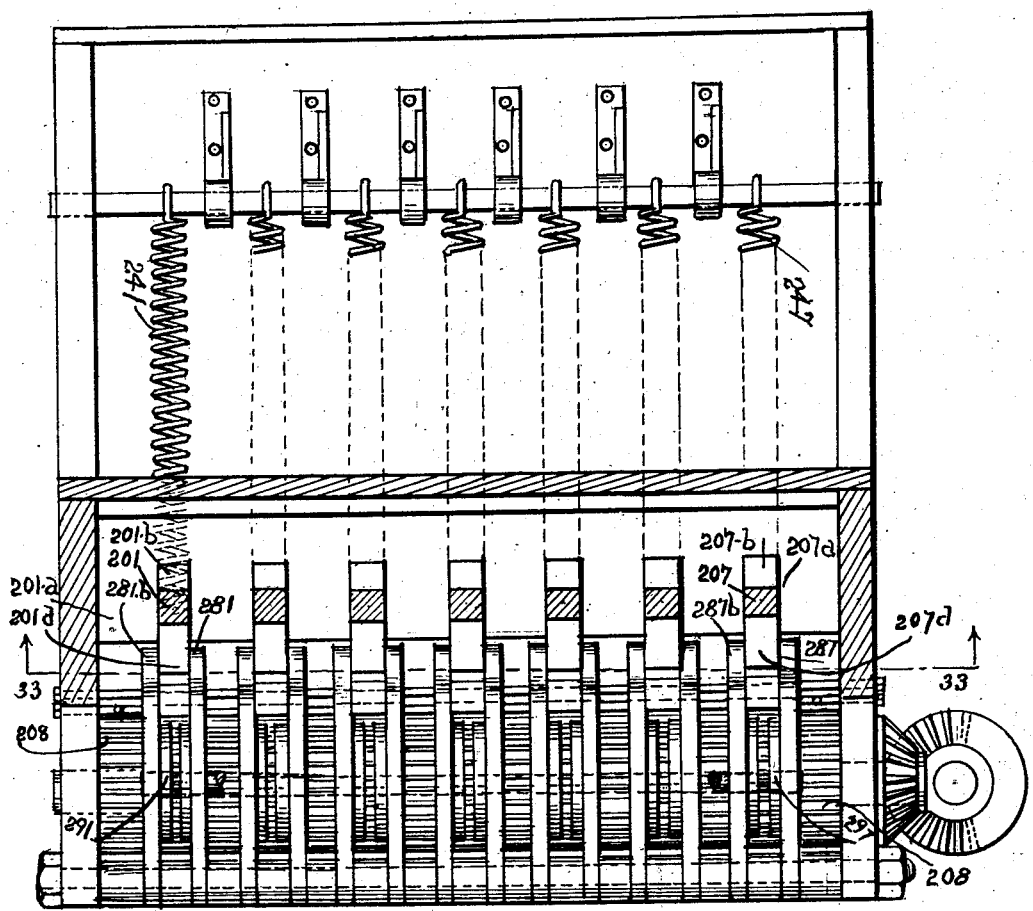
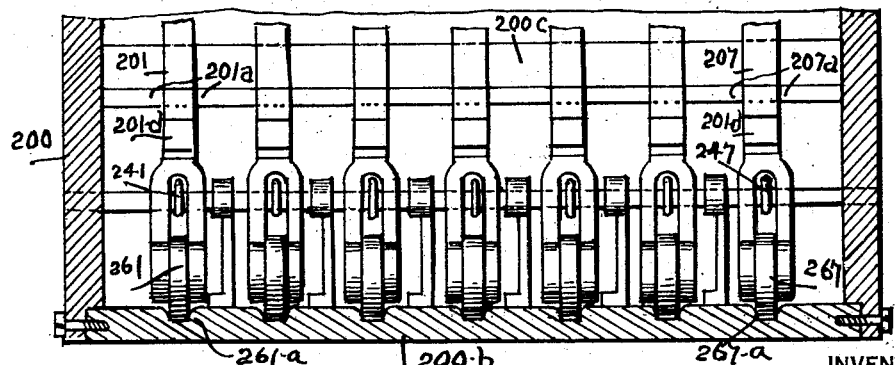
Fig. 34.
INVENTOR
Roy Emery
BY Charles F. Wilcox
HIS ATTORNEY

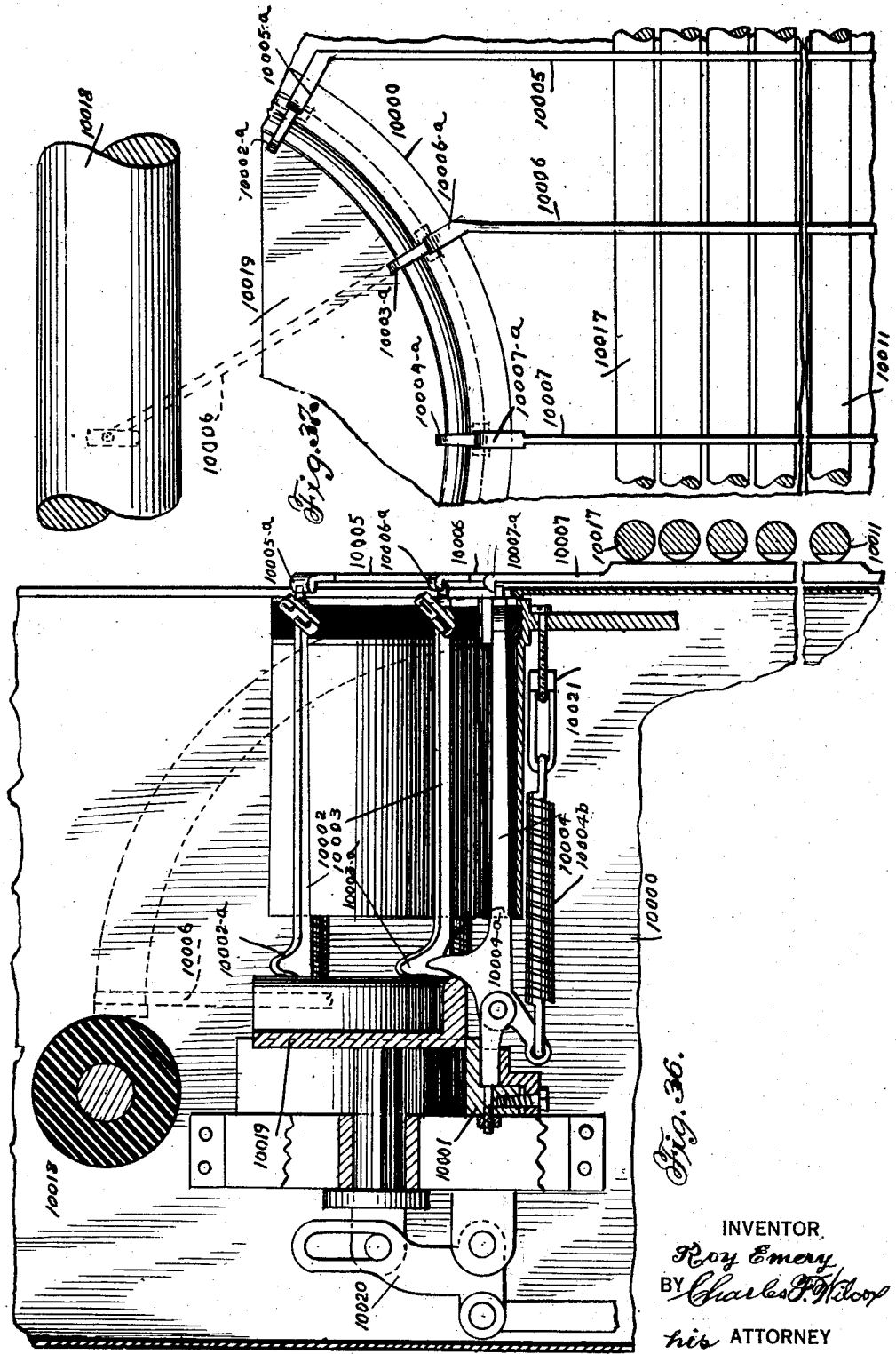

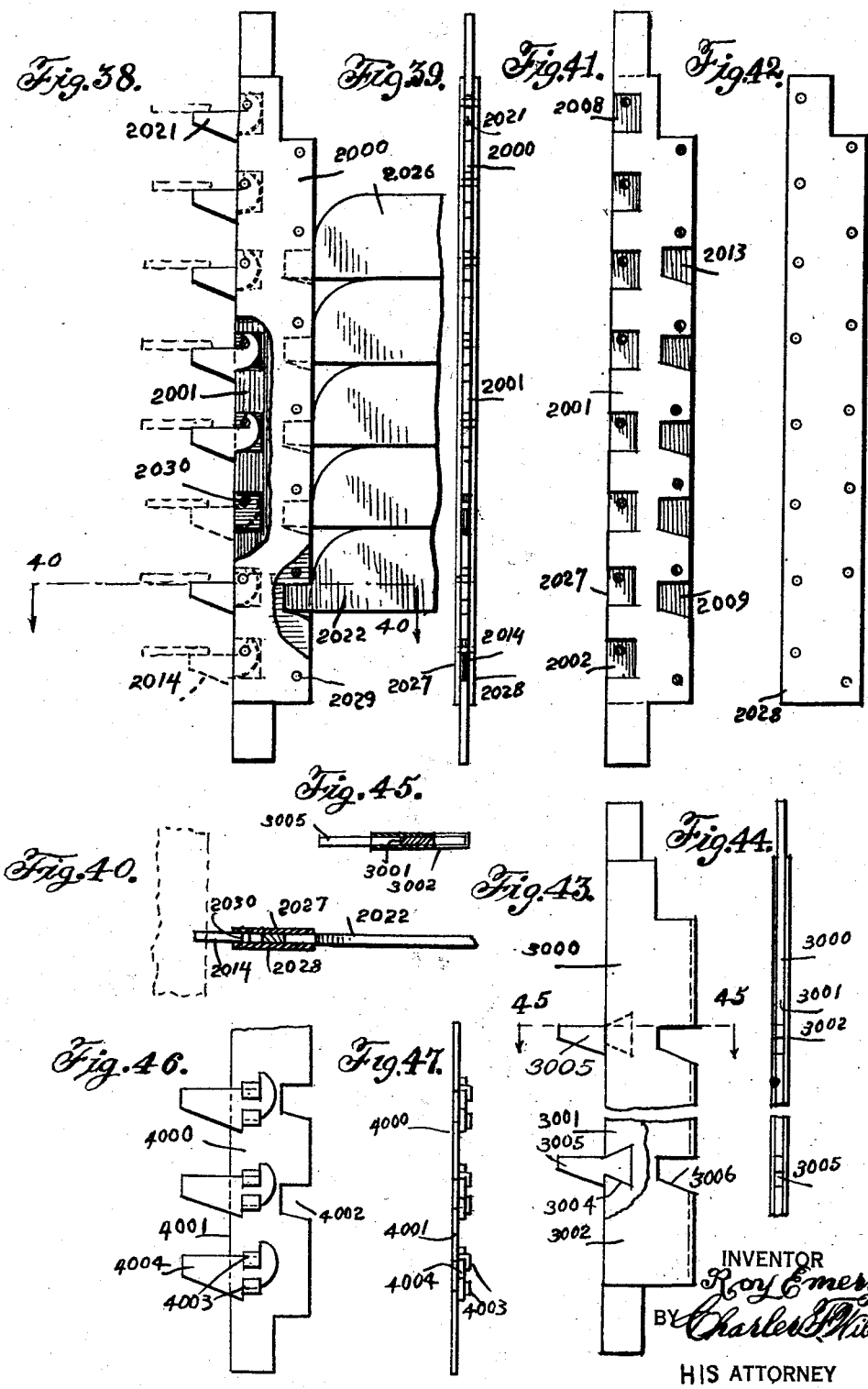

Patented June 2, 1931

1,808,597

UNITED STATES PATENT OFFICE

ROY EMERY, OF BROOKLYN, NEW YORK

SELECTIVE MECHANISM

Application filed June 23, 1925. Serial No. 39,155.

This invention relates to selective mechanism comprising a keyboard which controls operating units by means of a small number of bars, some of which are moved in various combinations simultaneously for each selection. The device may be applied to power typewriters, printing telegraphs, card punching machines, etc., and is specifically adapted in this case to a typographical machine of the circulating matrix class.

An object of this invention is to provide means whereby a relatively small keyboard, suitable for a touch system of operation, may control a relatively large number of different characters.

Another object is to provide a keyboard in which the arrangement of characters may be different from the sequence of units controlled.

Another object is to reduce the number of parts in the keyboard and escapement mechanism of typographical machines, and to provide escapement operating mechanism which may be placed either above or below the magazine controlled. Also to provide a keyboard which may be placed in any convenient position, that is, one which need not be directly in front of the magazine.

Another object is to provide a simple case shift adapted not only for lower case, capitals and small capitals, but also for main and auxiliary magazine shifts.

Another object is to provide a matrix escapement of fewer parts and which will positively eject a matrix. The selective mechanism is so designed that no matter how many keys may be operated simultaneously, accidentally or otherwise, only one combination of bars is moved, and thus only one matrix can be released at a time. This feature prevents "machine" transpositions and pied matrices in assembling.

Referring to the drawings:

Fig. 1 is a perspective view showing the general arrangement and plan of my invention as applied to a circulating matrix typographical machine;

Fig. 2 is a preferred form of keyboard;

Fig. 3 is a detail view showing the crank elements for actuating the releasing means;

Fig. 4 is a vertical sectional view of the keyboard mechanism taken on the line 4—4 of Fig. 2;

Fig. 5 is a vertical sectional view taken on the line 5—5 of Fig. 2;

Fig. 6 is a detail view showing means of locking and unlocking weights of the keyboard mechanism, taken on line 6—6 of Fig. 7;

Fig. 7 is a sectional view through line 7—7 of Fig. 6;

Fig. 8 is a fragmentary view of certain details of the keyboard mechanism;

Fig. 9 is a sectional plan showing details of the shifting mechanism;

Fig. 10 is a sectional view on the line 10—10 of Fig. 4, in which the line of vision is assumed to be inclined downwardly approximately 45 degrees from the horizontal, in order that three dimensions of the parts may be shown in the drawings;

Fig. 11 is a vertical sectional view similar to Fig. 10, showing one form of the selective weights employed in the mechanism in connection with the form of keyboard shown in Fig. 2;

Fig. 12 is a diagrammatic view indicating the combinations of the selective mechanism used for releasing matrices from the magazine, arranged in the order of character channels in general use at present;

Fig. 13 is a sectional view through a channel of the magazine showing the application of parts of my selective mechanism thereto;

Fig. 14 is a fragmentary group view on an enlarged scale showing parts of the selective mechanism;

Fig. 15 is a fragmentary view showing details of the selective releasing means;

Fig. 16 is a detail view showing parts in section shown in Fig. 15;

Figs. 17, 18 and 19 illustrate various positions of parts of the releasing means;

Fig. 20 is a side view of the type of rod shown in Figs. 14 to 19;

Fig. 21 is a sectional view of the rod shown in Fig. 20;

Fig. 22 is a view of one of the cams detached from the rod;

Figs. 23, 24 and 25 are views of modified forms of parts shown in Figs. 14 to 19;

Fig. 26 is a side view of one of the selective rods of a modified form;

Fig. 27 is a sectional view of one of the rods of the form shown in Fig. 26;

Fig. 28 is a view showing one of the cams of a modified form, detached from the cam rod;

Fig. 29 is a plan view showing the normal position of the cam elements of the releasing mechanism of the magazine;

Fig. 30 is a vertical sectional view of the transmission mechanism;

Fig. 31 is a sectional view through the line 31—31 of Fig. 30;

Fig. 32 is a perspective view of the vertical rod guide plate;

Fig. 33 is a sectional plan taken on the line 33—33 of Fig. 30;

Fig. 34 is a fragmentary sectional elevation taken on the line 34—34 of Fig. 30;

Fig. 35 is a sectional view of record strip perforating mechanism showing the adaptation of my selective mechanism to be employed for such purpose;

Fig. 36 is a sectional view of a telegraphic typewriter mechanism showing the adaptation of my selective mechanism thereto;

Fig. 37 is a fragmentary elevational view of the mechanism shown in Fig. 36;

Fig. 38 is a side view of a modified form of the key weights;

Fig. 39 is a view of the edge of the weight shown in Fig. 38;

Fig. 40 is a sectional view of the weight taken on the line 40—40 of Fig. 38;

Fig. 41 is a view of the inner member of the form of weight shown in Fig. 38;

Fig. 42 shows the outer member of the form of weight shown in Fig. 38;

Fig. 43 is a view showing a further modification of the weight;

Fig. 44 is a view from the edge of the form of weight shown in Fig. 43;

Fig. 45 is a sectional view taken on line 45—45 of Fig. 43;

Fig. 46 is a view of a further modification of the weight;

Fig. 47 is a view of the edge of the weight shown in Fig. 46.

Fig. 1 is a general view showing the three principal parts; the magazine unit 100, the transmission unit 200, and the keyboard unit 300. The magazine unit is shown above a magazine for circulating matrices, which is the same as those now in general use, with the exception of modified slots for the escapements. The assembling, casting and distributing mechanism are not shown.

The keys are on straight levers, 1 to 64, which are pivoted near their centers on rods 361 to 365 and are counterbalanced by weights 60x (Fig. 4).

All the weights are made alike, each having the projections 60a and 60b, which slide in the slotted guides, as 400. Fig. 8 shows the strip 400, with slots 401, 402, 403, etc., for these projections 60a and 60b. Each has the five recesses 60c, 60d, 60e, 60f and 60g, to serve as bearings for the end of the key levers, but only one is used in each case. At the rear of each weight project the eight extensions 60—I, 60—II, 60—III, 60—IV, 60—V, 60—VI, 60—VII, and 60—VIII. Eight horizontal blades, 301 to 308, pivoted in suitable bearings at each end, are placed behind the weights, one opposite each of said extensions. Blades 306 and 307 are also adapted to slide longitudinally when moved by shift keys 300a and 300b.

The shift key 300a has a flexible shaft 300c pivoted on member 300e, which is attached to the inside of the plate which forms the left end of the keyboard. The front end of the shaft projects through a curved slot in the top plate of the keyboard (Figs. 1, 2, 5 and 9). The pivot permits a right and left movement in a straight line and the flexibility of the shaft permits it to spring around the curve in plate but tends to keep it up at either end. The forked rear end of the shaft fits in a collar 307a near the end of the blade 307. The shift key 300b is similarly constructed and shifts blade 306.

A bar 366 and the levers 366a and 366b form the spacing key 367 (Fig. 1).

Fig. 2 shows the preferred form of keyboard layout. Each key is numbered at the top. The top figure at the right of each key is the number of magazine channel controlled by that key when both shiftable blades are in their normal position. The middle number shows the channel controlled by the key when blade 306 is shifted and blade 307 is normal. The bottom number shows the channel controlled when blade 307 is shifted and blade 306 is normal.

The preferred form of keyboard lock is shown in Figs. 4 and 10. A shoulder 308a on the inner side of the end plate of the keyboard engages the end of the leaf of blade 308 at 308b when the blade is shifted to the left, preventing upward movement of the blade and consequently, of all the weights and keys.

Figs. 6 and 7 show a modified form of weight lock. A semi-cylindrical bar 301a, rotatably held in the frame of the keyboard unit 300, is disposed in such a manner that the curved surface 301b will engage shoulders 60t of all the weights. A spring crank 301c is provided for turning the bar a half revolution to disengage all the shoulders. Frictional button 301d retains the bar in the desired poistion.

Fig. 10 is a sectional elevation, from an upwardly inclined angle of 45°, of the keyboard, showing the edges of the blades, taken on line 10—10 of Fig. 4. Fig. 11 is an inverted sectional elevation, taken upon the same plane as Fig. 10, but looking in the opposite direction from the sectional plane, and thus the parts shown are represented in the same relation as the opposite pages of an open book. Fig. 11 is inverted, accordingly, in the drawings. The character on the key for each key weight is indicated in Fig. 11. The dotted lines in Fig. 10 are continuations of the dotted lines from the center lines of the key weights in Fig. 11 and are given the corresponding key numbers 1 to 64 inclusive.

The blades are variously notched as shown in Fig. 10 so that the fingers of the key weights can engage the blades only where they are not notched.

The blades have the extensions 311 to 317 which are journaled so as to turn with them, but not to slide longitudinally. The cranks 321 to 327 on the ends of extensions 311 to 317 move flexible rods 331 to 337 through bearings in the transmission unit frame 200, shown in Fig. 1. Thus the turning of a blade in the keyboard results in the longitudinal movement of a corresponding horizontal rod in the transmission unit.

As shown in Figs. 30 and 31, the transmission unit also includes vertical members 201 to 207, each of which has a projection, as 227, Fig. 30, which bears against a cam, as 357, on one of the horizontal rods, as 337, when in the normal position. When a horizontal rod is moved its cam causes the vertical rod corresponding therewith to move in a right line guided by the grooves, as 201a, in the plate 200c, (Fig. 32) at a right angle with the horizontal rods, on a roller provided at the lower portion thereof. These rollers, as 261, move in grooves, as 261a, in the plate 200b (Fig. 34).

Figs. 30 and 33 show the cam yokes, as 281, pivoted at 281a, there being one cam yoke opposite each vertical rod, as 201. Each yoke is supported, as at 281c, by a spring trip, as 271. A rotary cam, as 291, is pivoted near the center of each yoke, each cam having a peripheral groove, across which is a pin, as 291a. Normally, these pins are kept against fixed stops, as 291b.

Spring 241 normally keeps vertical rod 201 to the left, as viewed in Fig. 30. When cam 351, on rod 331, pushes rod 201 to the right, roller 261 trips lever 271, which is pivoted near the center and is held in place by a spring as shown. This trip lever allows cam yoke 281 to drop, releasing pin 291a from stop 291b. Cam 291 drops upon continuously revolving cylinder 208 and is revolved by it until pin 291a again reaches stop 291b. The eccentric revolution of the cam causes part 281c of the yoke to raise rod 201 because shoulder 201d will be directly over it when roller 261 trips member 271. Spring 231 insures the return of rod 201 down. Spring 241 tends to keep rod 201 to the left as viewed in Fig. 30, but shoulder 201b, being against surface 201c of guide 200c, prevents this spring from acting while rod 201 is raised, and thus keeps shoulder 201d over part 281c of the cam yoke 281 while these parts are up. If horizontal rod 331 is not yet released (that is, if the key which moved it is still held down) when vertical rod 201 comes down, projection 221 will rest on cam 351 of horizontal rod 331. Then when the horizontal rod is returned to normal the vertical rod is pulled down by spring 231 so that roller 261 rests in groove 261a, the normal position. All the vertical rods 202 to 207 are controlled in the same way as rod 201, each by a different horizontal rod (332 to 337).

Vertical rods 201 to 207 serve to turn the magazine cam rods 101 to 107, to which they are connected by cranks 111, shown in Figs. 1 and 3. The vertical rods are made flexible enough to permit arcuate movement of said cranks. Turnbuckles, as 211, are provided for adjustment.

Upon the magazine plate 100a bearing members are provided, as 100b, for the rocking rods 101 to 107, and one spring bar 1001 is provided for each channel of the magazine. Fig. 13 is a sectional view of the first channel of the magazine. There is an extension disposed at a right angle with the body of the bar at 1100 which is securely held between the bed plate 1101 and the superposed plate 1102.

A casing 1103 is held upon the plates over the spring bars and secured by screws, as 1104, and is held at its forward edge upon an angle plate, as 1105, by screws, as 1106. The spring bars are disposed so as to span all of the rocking rods 101 to 107, and extend some distance beyond to allow for spring action, so they may be released or elevated by the rocking rods. On each of the rocking rods is a series of cam elements, 101—1, 102—1, 103—1, 104—1, 105—1, 106—1 and 107—1.

The said cams may be integrally made with the rocking rods, 101 to 107, or may be made removable, as shown in Figs. 13 to 28 of the drawings inclusive. In the drawings, two ways of preventing the cams from turning upon the rods are shown. The preferred manner, shown in Figs. 13 to 22 inclusive consists of providing a plurality of grooves as 101—1a, 102—1a, 103—1a, to 107—1a, for tongues of the cams. These cams are disposed at two different angles upon the rods, so that some of them will be inclined normally, but will be elevated to a position perpendicular to the magazine when the rods are rocked. The rest of the cams are normally disposed perpendicularly, as cam 101—1, Fig. 13 and inclined when rocked.

Under the spring bar 1001, shown in Fig. 13, there are six normally inclined cams and one normally perpendicular cam. Thus this particular spring bar can be lowered by its spring action only when the rocking rod 101 alone is actuated so that the perpendicular cam thereon is inclined, and when no other rocking rod or rods is actuated so as to elevate the cam or cams disposed thereon beneath the said spring bar.

When the cam is again raised to its perpendicular position, it raises spring bar 1001 to its normal position. Thus the spring bar for the channel shown in Fig. 15 is always released, and can be released, only when rocking rod 101 and no other is actuated. Rocking rod 101 can be actuated, however, and spring bar 1001 will not be released if any other one of the rocking rods is actuated at the same time because the cam on any of the rocking rods beneath spring bar 1001, will be elevated and prevent it from being lowered before the cam on the rocking rod 101 releases the spring bar. Arc-shaped bearing surfaces 1001—1, 1001—2 to 1001—7 for the cams are provided on the under surface of the spring bar 1001, so that any inclined cam, which may be moved into the perpendicular position will be brought into contact with an arc-shaped bearing surface, so as to support the spring bar before any perpendicular cam may be disengaged from an arc-shaped surface.

Fig. 15 is a fragmentary view on an enlarged scale of the arrangement of cams upon one of the rocking rods as 101, showing the grooves 101—1a and 101—1b, in dotted lines. Fig. 16 is a sectional view on an enlarged scale, showing the manner of disposing the cam upon the rocking rod.

Fig. 17 shows the inclined position of one of the normally perpendicular cams and Fig. 18 shows the perpendicular position of a normally perpendicular cam and it also shows the position of a normally inclined cam when raised to the perpendicular position. Fig. 19 shows the normal position of one of the inclined cams.

Each cam has one tongue as 1001—1a, Fig. 22. The grooves on the rods are spaced about 60 degrees apart (an arc equal to the movement of the rocking rod). The tongues of the cams which are normally in the perpendicular position are secured in the groove 101—1a, and the tongues of those normally in the inclined position are disposed in groove 101—1b.

Fig. 20 is a side view of the rod showing the grooves, one of the grooves being shown in dotted lines. Fig. 21 is a sectional view showing the disposition of the grooves without the cams in place. Fig. 22 shows the cam only.

A modified form of the rod and the cam is shown in Figs. 23 to 28 inclusive, each view corresponding with the preferred form immediately above. The rocking rods, as 101—$x$ are hexagonal and the cams 1001—1$x$ are open at the part which fits upon the rod as at 1001—1$xy$ so that they may be set in position upon the rods at any position desired.

The releasing means is shown in a preferred form in Fig. 13 and other views. A rod 1109 is disposed horizontally across the magazine and held rigidly upon suitable bearings. Rocking pawls, 1201, 1201, are disposed thereon at each channel.

The top channel plate 100a of the magazine is cut at 1301 and 1301a to admit the fingers 1201a and 1201b of the pawl, and finger 1001a of the spring bar 1001. The fingers 1001b and 1001c of the spring bar 1001 coact with fingers 1201c and 1201d of the pawl 1201 so as normally to retain the said pawl in the position shown in the drawings, whereby the finger 1201b is held in a lowered position.

When the pawl 1201 is in this position the finger 1201a thereof is in an elevated position just above and back of the toe of the second matrix in the channel of the magazine, and said finger is so shaped that when the pawl is rocked by the action of the fingers 1001b and 1001c of the spring bar when the spring bar moves downwardly, the finger 1201a of the pawl 1201 impinges forcibly against the toe of the second matrix, so as to push it forward and thus eject the first matrix.

Said finger of the pawl and finger 1001a of the spring bar are then in position to engage the ear of the second matrix and prevent the second matrix from following the first matrix from the channel before the key for the channel is again actuated. As the spring bar rises to its normal position the fingers thereof, 1001b and 1001c impinge against the fingers 1201a and 1201c of the pawl 1201 and restore it to its normal position as shown in Fig. 13.

There is a recess 1001e in the end of the finger 1001c of the spring bar, which interfits with the finger 1201c of the pawl and prevents the pawl from rocking so as to release the matrix resting against the finger 1201b thereof when the weight of other matrices in the channel rests against the first matrix. In this manner the finger 1001b impinges against the finger 1201d of the pawl 1201 to cooperate with the finger 1001c of the spring bar to restore the pawl to its normal position and to retain it in normal position. When the spring bar is lowered, the finger 1001c thereof drops within the recess 1201e of the pawl 1201 so as to permit the pawl to rock.

The means for preventing the release of more than one matrix from the magazine at a time consists of the extension 1001a which projects into the channel of the magazine in the path of the ear of the second matrix when the spring bar 1001 moves downwardly as above described.

When the spring bar is restored to its normal position the pawl 1201 is acted upon so that it is restored to its normal position and extension thereof 1201b extends into the channel and engages the ear of the matrix and prevents it from escaping from the channel.

Fig. 12 is a diagrammatic view illustrating the combinations of the selective mechanism of the magazine unit 100. The vertical lines indicate the magazine channels, 1 to 90 and the first line being a duplication of channel 1, is indicated as 0. The broken horizontal lines indicates the cam rods 101 to 107 inclusive and the small circles at the intersections indicate the normally perpendicular cam elements thereon.

For example: The circle at the intersection of vertical line 1, and horizontal line 101 indicates that there is a normally perpendicular cam there. When that cam is inclined and no other cam at channel 1 moves, the spring bar may be lowered to operate the escapement there. By looking below the character carried by the matrix in channel 1 is found to be "e".

At the intersection of vertical line 5 (channel 5 of the magazine) and broken line 105 (cam rod 105) a normally perpendicular cam is indicated, the only one over channel 5. When said cam is inclined, and no other cam under the spring bar over channel 5 is actuated, that spring bar is lowered and releases a matrix. The letter shown below indicates that the character released is "i".

By looking at vertical line 10, it will be seen that there are two small circles, one at the intersection of 101, and the other at 103, representing two normally perpendicular cams, and all the remainder of the cams over channel 10 are normally inclined. When the said two cams are inclined and no other cams over channel 10 are actuated then the spring bar controlling channel 10 will be lowered and a matrix ejected, and that character will be "d".

Two letters under the diagram, or two characters, indicate that the matrices used carry two different characters and that either the upper one will be desired without resort to the shift keys, or that by using the shift keys the lower character is desired, for example, the matrix carrying the characters figure 1 and small capital "v" may be released by the "1" key with or without shift if "1" is desired and by the "v" key with the small capital shift if "v" is desired. The character cast from it is determined by the operator, and the casting is done by means well known to those skilled in the art.

The modified form of weights shown in Figs. 38 to 42 inclusive, are made of sheet metal. The numeral 2000 represents the assembled weight; 2001 the central member having recesses 2002 and 2008 inclusive in one side thereof, and recesses 2009 to 2013 inclusive upon the reverse edge. Fingers 2014 to 2021 are disposed in the first mentioned recesses and any one of the key bars 2022 to 2026 may be inserted in one of the last mentioned recesses. The outer members are designated by the numerals 2027 and 2028. Rivets, as 2029, may be used to secure the parts together. Pins, as 2030, are secured in the holes of the outer plates, and extend across the recesses 2002 to 2008 to serve as supports for the fingers 2014 to 2021. The said fingers are removable.

In the modified weight 3000 shown in Figs. 43, 44 and 45, recesses as 3004 are cut in the edge of the inner member 3001 to admit fingers 3005, and in the opposite edge to admit key bars, not shown, as at 3006. The outer member, indicated by numeral 3002, is a casing made of one piece of sheet metal. Recesses therein correspond with the recesses 3006 of the inner member to admit key bars. The fingers, as 3005, are disposed in the recesses of the inner member and the casing is then assembled therewith, the sides thereof holding the said fingers firmly in place.

Figs. 46 and 47 show a still further modification of the form of the key weights employed. 4000 indicates the key weight as a whole, and 4001 the support, having recesses as 4002 for key bars (not shown) and clutches, as 4003, removably to retain the fingers, as 4004. In all of the modified forms of the weight it is possible to employ straight-edged blades which have no part cut away to prevent the fingers of the weights from engaging the same, since the fingers may be removed at each point where there should be no engagement.

My selective mechanism may be employed for perforating strips of material used for controlling electrical or pneumatic mechanism, as shown in Fig. 35. In Fig. 35, 5000 indicates the body of the part of the mechanism which would correspond with the transmission unit of the preferred form of my device shown in Fig. 1, and other figures of the drawings. The vertical bars 5001 to 5007 correspond with the vertical bars 201 to 207 in Fig. 1. 5008 indicates a perforated plate, 5009 a superposed perforated plate, and 5010 a strip to be perforated. This strip 5010 passes through a recess, as indicated, and the bars 5001 to 5007 are disposed in the bores 5011 to 5017 of the plate 5008. Whenever one or more of the bars are elevated, in a manner similar to the process described hereinbefore in the description of the preferred form of my device as applied to a typographical machine, then each bar that moves will make a perforation. Each time a key is depressed one or more of the bars will punch a hole through the strip.

The manner in which my selective mechanism may be utilized in printing telegraphs or power typewriters is illustrated in Figs. 36 and 37 of the drawings. In Fig. 36 the numeral 10000 indicates the frame of a typewriter, 10001 a supporting member for the type bars; 10002, 10003 and 10004 are type bars. 10005, 10006 and 10007 are spring bars normally engaging the said type bars and retaining them in readiness for action, by spring tension when released. 10011 to 10017 are cam rods, (some of which are not shown) which normally hold the said spring bars in engagement with the said type bars and prevent the type bars from moving toward the platen 10018. The reciprocating member 10019 restores the type bars to their normal position by action through the cam lever 10020, driven by mechanism not shown, synchronously with the action of the mechanism by which the spring bars are released. Any suitable motive power may be employed for actuating the parts shown, and this feature I do not claim as a part of my invention, but wish to claim only those elements which are essential to the selective mechanism described.

10002a, 10003a, and 10004a are shoulders upon the type bars which are engaged by the reciprocating member 10019 to restore the type bars to normal position. There is a catch, as 10005a, 10006a and 10007a on each of the respective spring bars, to engage an extension upon each of the type bars, so that when any one or more of the spring bars is released by the action of the cam rods, the type bar will be immediately released, and the type will strike the paper upon the roll, by means of the force of a spring, as 10004b. The reciprocating member 10019 will restore each type bar as soon as it has contacted with the paper on the roll. Adjustment for the spring 10004b is provided in the screw and turn buckle 10021. The movement of the cam bars in the printing telegraph or power typewriter may be effected by the keyboard and transmission mechanism hereinbefore described.

A detailed description of the operation of the specific form of the machine, with especial attention given to the action of the keys relative to their respective matrix channels follows.

The fonts of two-letter matrices in general use carry roman letters in the ordinary position and bold-face or italics with small capitals in the raised or auxiliary position. These fonts may be divided arbitrarily into four groups: (1) the lower-case letters; (2) the small capital letters; (3) the capital letters; (4) quads, leaders, figures, ligatures, marks of punctuation and signs (such as asterisk, ampersand, etc.). Fig. 12 shows that with the exception of "z" the lowercase letters require no movement of blades 106 and 107; the small capital combinations always include blade 106 and never include blade 107; the capital letters with the exception of "Z" require a movement of blade 107 but not blade 106; and the fourth arbitrary group may or may not require either or both of said blades. For all keys which control letters of the alphabet (except "z"), therefore, the shiftable blades 106 and 107 are notched opposite the weights in the normal position, so as not to be moved by them, but they are not notched in the shifted position. For all keys which are not letters of the alphabet (group 4 above) the normal and shifted combinations of the blades are duplicate (that is, either both notched or neither notched, as the case may be), and thus any shift does not change the combinations for this group.

(1) With the shiftable blades in the normal position, if key 21, "B", is depressed the movement will raise the corresponding weight, and, according to Fig. 10, blades 301, 303 and 305 will be rocked, since these blades are not notched at that place (indicated by broken line 21). The uppermost figure next to the 21st key, "B" in Fig. 2, shows that the 20th channel of the magazine is controlled by this key when both shiftable blades are in the normal position. Referring to line 20 in Fig. 12, it is seen that this 20th channel of the magazine contains the lower-case "b" matrices, and that on rods 101, 103 and 105 the cams are normally perpendicular at that place and the cams on the other rods (102, 104, 106 and 107) are normally inclined. Simultaneous movement of blades 301, 303 and 305 results in a corresponding movement (by means of the connecting parts, as before explained) of the rods 101, 103, and 105, and, accordingly, inclination of the cams on those rods at the 20th channel. Since the other cams here are normally inclined and have not been moved, all the cams therefore are then inclined, unlocking the 20th spring bar, which acts to eject one matrix from that channel. The same process is followed for each lower-case letter except "z", each having a different combination.

(2) With blade 306 in the shifted position and blade 307 in the normal position, depression of key "B" results in the movement of blades 301, 303, 305, and 306. In Fig. 10, the portion of blade 306 between lines 21 and 22 is shown solid. Shifting this blade brings this solid portion directly opposite the weight for key 21, so this blade 306 is moved in addition to the regular blades moved by this key. The middle figure next to the "B" key in Fig. 2 is 50, showing that the 50th channel of the magazine is controlled thereby when the small capital shift obtains. Referring to line 50 in Fig. 12, it is seen that the 50th channel contains matrices which have the figure "2" in their lower position and the small capital "B" in the upper position for casting. At the 50th channel the bars 101, 103, 105, and 106 carry perpendicular cams and when these cams are inclined and the other cams (on bars 102, 104, and 107) are not raised, the spring bar for channel 50 is unlocked, resulting in ejection of a matrix carrying the figure "2" and the small capital "B". The operator directs the desired character, "B", to the mold by means of a duplex rail in the assembling mechanism, this method being known to those skilled in the art, and is not a part of this invention. All the other small capitals are similarly obtained, except "X" and "Z".

(3) With the blade 306 in the normal position and blade 307 in the shifted position, depression of key "B" results in the movement of blades 301, 303, 305, and 307. In Fig. 10 the portion of blade 307 between lines 21 and 22 is shown solid, so that when this blade is shifted this solid portion is presented to the weight for key 21, and therefore this blade, 307, is moved as well as the normal blades, 301, 303, and 305 when the weight for key 21 is raised. The bottom figure next to key "B" in Fig. 2 shows that with this shift the 80th channel is controlled. Fig. 12 shows that the 80th channel contains the capital "B" matrices and that the cams are normally perpendicular at this channel on bars 101, 103, 105 and 107. Simultaneous movement of blades 301, 303, 305, and 307 results in simultaneous movement of bars 101, 103, 105 and 107, inclining the perpendicular cams. Since bars 102, 104, and 106, carrying inclined cams are not moved, the 80th spring bar is unlocked and one capital "B" matrix ejected accordingly. All the other capital letters are similarly obtained (except "Z").

(4) With blades 306 and 307 in any position, if the 52nd key, "2", is depressed blades 301, 303, 305, and 306 will move. Shifting blades does not change this combination, since "2", being a numeral, is of the fourth group mentioned above, and therefore the combinations are duplicated on the shiftable blades where they cross the weight for this character. Whenever this key is depressed the matrix carrying the "2" and small capital "B" will be delivered in the same way that it is delivered when the blade 306 is in shifted position and blade 307 in normal position and key "B" depressed. When the small-capital shift is in effect that matrix will be ejected as a result of operating either the "B" or the "2" key. All of the other matrices of the fourth arbitrary group which carry small capitals in the upper position (see Fig. 12) are obtained in a similar manner.

(5) With blades 306 and 307 in any position, if the 46th key is depressed blades 301, 305, 306, and 307 will be moved by its weight; see Fig. 10. The three figures next to the hyphen key in Fig. 2 all being the same, show that the 43rd channel of the magazine is always controlled thereby, whatever the position of the shiftable blades. No other key will give the same combination with any shift. The cams on bars 101, 105, 106, and 107 at the 43rd channel are normally perpendicular, so when they are inclined simultaneously and none of the other cams (on bars 102, 103 and 104) are raised, the spring bar of the 43rd channel is unlocked, resulting in the ejection of a matrix bearing a hyphen. All of the other matrices of the fourth arbitrary group not carrying small capitals are obtained in a similar manner.

The small capitals "X" and "Z" do not run in the magazine ordinarily, but are put into the assembler by hand.

The lowercase "z" is an exception to the system of combinations explained above for a specific form of the device applied to a matrix magazine of the kind now in general use. The depression of the "Z" key (number 14) results in a movement of blades 303, 305, 306 and 307, under normal conditions of shift. Shifting blade 306 does not affect this key. Shifting blade 307 results in the combination 303, 305, and 306, since at this place blade 307 is solid in the normal position and notched in the shifted position (the opposite of all the other letters of the alphabet), and this combination controls channel 86, which contains matrices bearing the capital "Z" in the lower position and the small capital "U" in the upper position. The latter combination is also obtained when the small capital shift is in effect and the "U" key is depressed.

The foregoing description shows the characters are selected by the combination of elements actuated, and that that combination is effected by a weight turning certain blades. The combination of blades turned is determined by the presence or absence of notches on the blades opposite that weight, or by the presence or absence of fingers on that weight. Thus the keys are arranged in accordance with the notches in the blade or the fingers on the weights, and this arrangement is in no way limited by the sequence of the character channels in the magazine.

While I have shown seven elements, I deside it to be understood that I do not limit myself to that specific number, but have used it because it is the smallest number that will serve to operate the 90 escapements of the magazine most commonly in use. The number of changes possible with even blades is the seventh power of 2, minus 1, equals 127, the subtracted unit representing the combination for the normal position.

Two shifts are shown because three alphabets are used, that is; lower case, small capitals and capitals. It is obvious that any or all of the other blades may be made shiftable. Indeed, it is possible to use but one finger key and shift various combinations of blades simultaneously and still obtain the same results in selecting type units, as in the plan or means shown and described. It is also possible to obtain all combinations by having one key for each blade and using these keys simultaneously in various combinations. The cam bars may be lengthened to cross an auxiliary magazine, and another blade made shiftable to control its characters.

In the embodiment of the invention here shown, if any two keys are operated simultaneously, the result will be the addition of the two combinations corresponding to those keys and this addition will result in a third combination, which will be transmitted to the magazine, and a character corresponding to the third combination will be selected. Thus it is impossible to release more than one matrix at the same time, regardless of the number of keys touched at the same time. This eliminates a difficulty with the present machines, when several keys are accidentally depressed at once.

While weights are shown in the keyboard to turn the blades, in certain cases it would be convenient to use slides held by springs, for instance, if required to dispose the elements in other than the vertical position shown. I therefore desire it to be understood that I do not limit myself to the specific construction and arrangement of the parts, but I have here shown my invention only in one preferred form and by way of example, and as applied to a machine of the class mentioned. Many modifications and alterations therein and in their mode of application, may suggest themselves to those skilled in the art without departure from its scope. I therefore desire it to be understood that I do not limit myself to any specific construction or arrangement of the parts, except insofar as such limitations are specified in the claims.

What is desired to be secured by Letters Patent and is claimed as new is:

1. In a typographical machine having a selective mechanism adapted to be actuated by a keyboard mechanism, a plurality of keys, a lever for each of the keys, a weight movably held and adapted to be moved by each key lever, a plurality of extensions on each weight; a plurality of parallel blade elements movably held adjacent to the weights, and so formed that each of the weights will engage a selective number of the blade elements when moved by the keys; means for transmitting the movement to a corresponding number of selective elements of the selective mechanism to be actuated by the keyboard.

2. In a typographical machine, a keyboard of the layout shown, each key having a key lever; a weight movably held and adapted to be actuated by each key lever; each weight having a plurality of extensions thereon; a plurality of parallel blades movably held in horizontal position in alinement with the extensions of the weights, said blades having indentations at various portions thereof, and thereby so arranged that the extensions of the weights selectively engage certain of the blades when actuated by the key levers, and simultaneously actuate the blades; and means for simultaneously transmitting movement from the blades to corresponding parallel selective elements of selective mechanism to be operated.

3. In a typographical machine, a selective mechanism to be actuated by a keyboard, including a plurality of movable parallel members; a plurality of corresponding parallel movable members mounted in the keyboard mechanism; means for selectively actuating one or a plurality of the last named parallel members, and crank elements on said members; a plurality of substantially horizontal rods connected with said crank elements, cams on said rods, guides to retain said rods, springs to retain the rods in normal position; a plurality of substantially vertical rods at a right angle with the last-named rods, guides for the said rods, and springs to retain the said rods in normal position; the cams on the horizontal rods being adapted to move the vertical rods in a lateral direction from the horizontal rods, in the guides provided for the lower ends of the vertical rods, said vertical rods having shoulders thereon; trip-yokes, adapted for being tripped by the vertical rods when moved laterally and cam yokes adapted for engaging the shoulders of the vertical rods, and raising them vertically in the guides, and shoulder elements on the vertical rods adapted to engage the upper surfaces of the cams of the horizontal rods, whereby each of the vertical rods are held in an elevated position after being raised by the cam yokes until the horizontal rods and the selective blades have been restored to their normal position, and the selective group of vertical rods can not be again raised as required to actuate the selective mechanism, until the mechanism has been restored to normal; and means connected with the vertical rods for actuating the selective mechanism so that the control for a character corresponding with the character of the key of the lever actuated, will be actuated in the selective mechanism.

4. In a typographical machine, a keyboard, a key lever for each key, a plurality of selective blades, some of said blades being movable longitudinally and all of said blades being movable upon axes; a weight element movable by each key lever of the keyboard, extensions on the weight elements adapted to engage the blades, and an extension and a blade adapted for locking the weight elements so that they cannot be moved by the key levers, and means for retaining the locking blade in both the locked and unlocked position.

5. In a typographical machine, selective mechanism, comprising, a plurality of keys, a plurality of weights, one adapted to be moved by each key, each of said weights having a plurality of extensions thereon; a plurality of parallel blades arranged contiguous with the weights and each having indentations therein whereby the extensions of said weights will engage the blades at certain portions thereof and will not engage them at other portions, some of said blades being movable longitudinally so that the extensions of the weights may engage the blade when shifted, differently from the manner in which they engage the blades when not shifted; means for shifting the blades which are movable in a longitudinal direction, and means for locking the keyboard.

6. In a typographical machine, keyboard mechanism, comprising a plurality of keys, key levers for all keys; a weight for each key lever, movably held so as to be raised when the key is depressed; guides for said weights; extensions on the weights, a series of parallel blades rockingly held in the frame parallel and contiguous to the weights so that they may be engaged by the extensions on the weights; indentations at portions of each of the blades whereby the blades may be selectively engaged; shifting blades, indented so that the extensions of the weights will engage the blades differently when shifted; means for shifting the shifting blades, and means for adjusting accurately the distance to which the shifting blades may be shifted.

7. In a typographical machine, selective mechanism, comprising a plurality of keys; a lever for each key; a weight engaged by the lever of each key, each weight being movable in guides, and each having a series of extensions thereon adapted for engaging blade elements; a series of selective blade elements rockingly held contiguous to the extensions of said weights, each blade having indentations according to a prearranged system or code, whereby one or more of the blades may be moved by the said weights in accordance with the series of combinations of the code so that one or more blades will be actuated by corresponding keys of the keyboard in accordance with the predetermined system; blades longitudinally shiftable whereby a different series of indentations may be brought opposite the extensions of the weights, means for shifting said blades, means for adjusting the shift of said blades, and means for securely retaining the shift adjustment in the desired position of adjustment.

8. In a typographical machine having a matrix magazine, escapement mechanism comprising a plurality of movable rods disposed across the magazine, means for moving the rods in various predetermined combinations, spring members engaging the rods, an extension thereon engaging a pivoted pawl, said pawl having extensions thereon adapted to retain the matrix in the channel normally, and to release it when the spring member is actuated and simultaneously to position the succeeding matrix and retain it in readiness for release, and an extension upon each spring member adapted to enter the channel and cooperate with the pawl to control the matrices.

9. In a typographical machine having a matrix magazine, a pivoted pawl disposed adjacent to the outlet of each channel of the magazine, said pawl having an extension disposed within the channel for retaining a matrix, a second extension adapted for ejecting the matrix, a third extension adapted for engagement by a spring and a fourth extension adapted for locking the pawl; spring means for actuating said pawls, one for each pawl, and each having an upper extension thereon for actuating its pawl, so that normally the pawl is prevented from releasing a matrix, but when the spring moves the pawl is actuated thereby to release and eject the matrix; each spring having a lower extension disposed in the channel of the magazine to engage the following matrix when the spring is lowered and prevent it from following the first matrix out of the channel until the spring is raised, whereupon the second matrix then assumes the place of the first matrix in readiness for being released; means for retaining the spring members, and means controlled by a keyboard mechanism for selectively actuating the pawls of the releasing mechanism.

10. In a typographical machine having a matrix magazine, escapement operating mechanism, including a plurality of parallel rods adapted to be selectively moved by keyboard mechanism, said rods being mounted rotatably in suitable bearings upon the magazine, crank elements thereon whereby they may be rotated through one-sixth of a revolution; cams upon the rods, one on each rod for each channel of the magazine, said cams being disposed at two different angles so that some of them will be normally inclined, and the rest substantially perpendicular, and arranged so that the inclined cams will be perpendicular and the perpendicular cams will be inclined when the rods are rotated; spring members, suitable for actuating escapements, held normally in a raised position above the cams and supported thereby; the cams being arranged in a predetermined manner, so that only when such cams as are perpendicular are moved the spring member will act and a matrix of the corresponding channel will be released, but when any of the inclined cams are moved the spring member does not act.

11. In a selective mechanism, a plurality of parallel cam rods, held rockingly in a transverse relation to a plurality of substantially parallel channels; each channel being designed to conduct one different class of a plurality of classified units; a plurality of releasing members to regulate the units in the channels, one to each channel, and a cam on each of one or more of the several cam rods for actuating each one of the releasing members, in accordance with a system of combinations.

12. In a selective mechanism, a plurality of parallel members adapted for being moved singly or in any combination thereof, means for so actuating said parallel members, a plurality of cam-controlled members for exerting mechanical force for selective operations, cam means upon the parallel members arranged and adapted so that the cam-controlled members are selectively actuated directly by the movement of one or more of the parallel members in various combinations.

13. A selective mechanism comprising a plurality of levers; a plurality of cam members adapted for actuating said levers; cams for the cam members being differently arranged at spaced intervals, whereby one or more cams of the cam members, in accordance with a predetermined order, will actuate directly a certain lever so as to perform a certain function thereby, when one or more of the cam members are moved.

14. In a typographical machine including a matrix magazine, a plurality of cam-actuated levers each adapted for releasing a single matrix from its respective channel, a plurality of parallel cam members disposed transversely relative to said levers, and each having a plurality of spaced cam elements thereon, adapted for directly actuating the said levers, so that a single lever is actuated so as to release a matrix when one or more of the cam members are actuated selectively in accordance with a predetermined order, and means for actuating the cam members whereby the releasing means of the matrices may be actuated from the side of the magazine.

15. In a selective mechanism, a plurality of keys arranged in a keyboard; one gravity pawl for each key, each of said pawls having a plurality of fingers or clutches thereon; a plurality of blade members, rockingly held in the frame of the keyboard mechanism, each of said blades having indentations thereon at various intervals, whereby some of the clutches upon the pawls may engage blades and others may not engage blades; crank elements connected with said blades; a plurality of horizontal rods disposed transversely of a matrix magazine; cam means upon said rods over each channel of the magazine, said cam means being adapted to control matrix escapements; a plurality of vertical rods adapted for actuating each of the horizontal rods; mechanical means for actuating the vertical rods, and means for automatically restoring said rods to normal position; a plurality of rods connected with the said blades of the keyboard mechanism, and cam means thereon for moving the vertical rods into engagement with the means for actuating them, whereby a predetermined combination of cams upon the horizontal rods may be actuated so that a required matrix will be ejected from the magazine.

16. In a selective mechanism, a plurality of gravity pawls, each engaged by a key in a keyboard, each pawl having a plurality of clutches arranged in series thereon; a plurality of differentially indented blades movably held in apposition to said pawls and each disposed in apposition to one series of the said clutches of said pawls; means operatively connecting each blade with one of a plurality of rods disposed upon a magazine whereby the rods of the magazine may be actuated synchronously with the blades of the keyboard mechanism, each rod by its respective blade.

17. In a selective mechanism for a typographical machine, a plurality of spring bars on a matrix magazine, one for each escapement; a plurality of cam rods disposed across the magazine; a cam on each rod for each channel, for controlling the spring bar of the said channel, so that its escapement may be actuated when a predetermined number of the cam rods are actuated; a plurality of vertical rods, adapted for actuating the cam rods of the magazine; a plurality of horizontal rods adapted for moving the vertical rods into engagement with trip means, whereby the vertical rods may be actuated by a plurality of cam yokes; crank means connecting the horizontal rods with a plurality of blades movably held in a keyboard mechanism; a series of differential indentations on one edge of said blades; a plurality of gravity pawls arranged in apposition to said blades, each pawl having a clutch opposite each blade adapted to engage the blade provided it is not indented at that point, a plurality of keys, each key having a key lever engaging one of the pawls; whereby a matrix carrying a character corresponding with the key may be released from the magazine whenever such key is depressed.

18. In a selective mechanism adapted for selectively releasing matrices or other units from a magazine, a plurality of cam members disposed transversely of the magazine, each having a cam element for each channel thereof; a plurality of trip rods each connected with one of said cam rods; a cam yoke, a cam trip and a spring trip, adapted for actuating each trip rod; a pawl for each key; in a keyboard, a series of clutches on each pawl; a plurality of movable blades disposed in apposition to each of said pawls, and having each a differentially indented edge in juxtaposition to said pawls; a plurality of rods, one connected with each of said blades, and adapted to move the trip rods into engagement with the spring trips so that they may be elevated by the cam trips and cam yokes.

19. In a selective mechanism of the character described, a plurality of trip rods; means for selectively tripping the trip rods in different combinations; a spring trip adapted to release a cam yoke to move the trip rods; means for actuating the cam yoke so as to actuate the trip rods in combinations corresponding with combinations in which the trip rods are tripped; cam means for guiding the trip rods when actuated until the trip rods are restored to the normal position; means for preventing a repeating movement of the trip rods, until tripped again; and means for restoring the trip rods to normal position for another operation.

20. In a selective mechanism of the character described, a tripping mechanism, comprising a cam yoke, a rotary cam, a spring trip adapted to support the cam yoke, a trip rod, means for moving the trip rod to actuate the spring trip and bring the cam yoke into engagement with the trip rod, so that the rotary cam will actuate the cam yoke, whereby the trip cam will actuate the trip rod.

21. In a typographical machine, an escapement, comprising a pivoted pawl having a front projection to hold a matrix in a magazine channel ready for releasal, a rear projection adapted to impinge upon the toe of a second matrix, in the channel when the pawl is moved and force it forward, so that when the front projection releases the ear of the first matrix the first matrix is ejected forcibly from the magazine; said pawl also having a top projection adapted to interlock with a top finger upon a releasing element, to prevent the pawl from moving by pressure of the matrix; and a middle projection co-acting with a middle finger of the releasing element so that the finger of the releasing element forces the pawl to rock when the releasing element is actuated; said releasing element having a lower finger adapted to enter the channel of the magazine when a releasal is made, and engage the ear of the second matrix to prevent it from escaping from the magazine with the first matrix.

22. In a selective mechanism of the character described, a keyboard; a key lever for each key; a pawl, engaged by each key, a plurality of clutches on each pawl; a plurality of indented blades in juxtaposition with said clutches said blades being movable by said clutches, either singly or in various combinations; a crank element upon each blade; a rod connected with each crank element; cam means on each rod for actuating one of a series of trip rods; spring trips, each adapted to be tripped by a corresponding trip rod; a plurality of cam yokes and cam trips supported thereby, adapted to be tripped by the spring trips; a rotor adapted to actuate each of the cam trips and trip yokes, singly or in various combinations; cam means for guiding the trip rods and preventing them from being disengaged from the cam yokes until the trip rods have been completely actuated as required; automatic means for restoring all the parts to normal after a movement is completed; a cam on each cam rod and a shoulder on each trip rod, which co-act to prevent a repetition of the trip movement until the key is released; adjusting means to regulate the thrust of the trip rods; a plurality of cam rods transversely disposed relative to a matrix magazine; a cam element on each rod for each channel of the magazine; each cam rod being controlled by one of the trip rods; an escapement for each channel, comprising a rocking pawl, having fingers for engaging the matrices; a releasing element having fingers adapted for actuating and retaining the rocking pawl, and a finger adapted for engaging the matrices, said releasing element being adapted for actuation, either by one of the rods, or by various combinations of the rods; whereby a different matrix may be released with every different combination of the cam rods actuated.

23. In a selective mechanism of the character described, a pawl, adapted to be moved by a key, said pawl having a plurality of extensions or clutches removably held thereon, each clutch being adapted to engage one of a series of movable units.

24. In a selective mechanism of the character described, having a keyboard unit with a plurality of movable members therein adapted to be actuated in different combinations by each key of the keyboard unit, and a magazine unit having a plurality of movable parallel members adapted to move in a different combination for each channel of the magazine, a transmission unit comprising a plurality of trip units corresponding with the movable units of the keyboard mechanism and the magazine mechanism, and a plurality of cam members adapted for actuating the trip units in combinations corresponding with the combinations of the keyboard units whereby the parallel members of the magazine unit may be actuated by the trip units in corresponding combinations so that a matrix may be released which corresponds with the key actuated.

25. In a machine containing a series of lettered, numbered, or otherwise differentiated elements, a mechanism for actuating said elements, comprising a keyboard, slides moved by the key levers thereof, a group of permuted parallel rocking members adapted to be actuated singly or in any combination by said slides; a second group of movable members, each adapted to be actuated by one of the first group of parallel members and each having cam surfaces in varied permuted relationship; a series of members adapted to be actuated by said cam surfaces, said members controlling or actuating said differential elements.

26. A multiple combination lock mechanism, comprising a plurality of parallel active members having cams thereon in permuted relation, a plurality of passive members in parallel planes at right angles to said active members and held locked by said cams, each passive member being unlocked and directly actuated by a distinct predetermined number of its corresponding cams.

27. In a typographical machine having a standard sequence of matrix channels, a keyboard having a different sequence of keys, said keys controlling the matrix escapements by means of permuted cam bars moving in various combinations.

28. In a typographical machine, an escapement pawl, comprising a pivoted pawl having a projection to retain a matrix, a projection to eject a matrix, and a projection for locking itself against movement.

29. In a typographical machine, keyboard and escapement mechanism, comprising: keys on key levers counterbalanced by weights; parallel, horizontal, notched blades adapted to be rocked by projections on the weights in various combinations when said weights are raised; connected to each blade, a corresponding rocking cam rod placed across the channels of a matrix magazine; a cam on each rod at each channel, certain cams being projected and the rest depressed; a spring for each channel; each spring being kept stressed by the projected cams for its channel, and being released to operate an escapement when all its cams are depressed.

30. In a typographical machine, a keyboard having keys arranged in five rows as follows: top row: ffl, (, ), ?, !, colon, semicolon, quote, apostrophe, em dash, $, vertical dash; second row: æ; ffi, J, C, B, Q, U, L, Y, hypen, 1 (figure), 5, 9; third row: œ, fi, M, T, H, I, R, D, S, thin space, 2, 6, cipher; fourth row: *, ff, P, W, E, O (letter), N, K, comma, en quad, 3, 7, en leader; bottom row:, fl, Z, V, A, F, G, X, period, em quad, 4, 8, em leader.

31. In a typographical machine having a magazine for circulating matrices a keyboard with keys for a single alphabet and other characters; means for controlling the escapements of the magazine, including toothed blades; and means for shifting said blades to control any one of a plurality of alphabets contained in said magazine from the single alphabet of the keyboard.

32. In a selective mechanism, a plurality of parallel rocking blades; a series of parallel, equally spaced, transverse pawls having projections to rock said blades; a differential series of notches on the blades, each notch being deep enough to prevent contact with said projections; a second series of notches disposed alternately with said first series, that is, opposite the spaces between the pawls; and means for shifting said blades longitudinally to bring said second series opposite the pawls.

33. In a keyboard, a self-locking shift mechanism, comprising a notched rocking member movable longitudinally by a shift key, said key having a resilient shaft which passes through a curved slot in a plate.

In testimony whereof, I, Roy Emery, have signed my name this 9th day of June, 1925.

ROY EMERY.